United States Patent [19]

Ziemba

[11] 4,091,733
[45] May 30, 1978

[54] ELECTRICAL SETBACK GENERATOR

[75] Inventor: Richard Thomas Ziemba, Burlington, Vt.

[73] Assignee: General Electric Company, Burlington, Vt.

[21] Appl. No.: 769,648

[22] Filed: Feb. 17, 1977

[51] Int. Cl.² ............................................. F42C 15/40
[52] U.S. Cl. ............................................. 102/70.2 GA
[58] Field of Search .................. 102/70.2 G, 70.2 GA

[56] References Cited

U.S. PATENT DOCUMENTS

| 2,966,856 | 1/1961 | Tatel | 102/70.2 GA |
| 3,035,520 | 5/1962 | Koeppen | 102/70.2 GA |
| 3,119,335 | 1/1964 | Wyser | 102/70.2 GA |
| 3,120,187 | 2/1964 | Wyser | 102/70.2 GA |
| 3,981,245 | 9/1976 | Buzzell et al. | 102/70.2 GA |
| 4,044,682 | 8/1977 | Karayannis | 102/70.2 GA |

Primary Examiner—Charles T. Jordan
Attorney, Agent, or Firm—Bailin L. Kuch

[57] ABSTRACT

An electrical setback induction generator for ammunition projectile fuses is provided which is maintained safe until both setback (inertial) and spin (centrifugal) forces are applied thereto.

8 Claims, 6 Drawing Figures

ELECTRICAL SETBACK GENERATOR

BACKGROUND OF THE INVENTION

1. Field of Art

This invention relates generally to electrical generators, and especially to a setback or inertia generator for projectile electrical fuzes.

2. Prior Art

A mechanical fuze which preconditions arming on the substantially simultaneous presence of both adequate spin and setback forces is shown in my patent, U.S. Pat. No. 3,595,169 issued July 27, 1971. That fuze includes a ball rotor which carries a detonator in a diametral bore, and a dished retaining ring which is mounted on a seat cut into the ball to normally fix the ball with the detonator out of alignment with the longitudinal axis of the fuze. To release the rotor, the dished ring must be flattened and moved aft by setback force and must be enlarged by centrifugal force.

Electrical setback generators which become armed under the application of setback force are shown in U.S. Pat. No. 3,120,187 issued Feb. 4, 1964 to G. Wyser; my patent with C. E. Buzzell, U.S. Pat. No. 3,981,245 issued Sept. 21, 1976 and in Technical Report 4624, "Beehive Electronic Time Fuze", by Picatinny Arsenal, Dover, N.J. dated April 1974. These generators utilize the relative movement of a permanent magnet with respect to a coil to generate a voltage pulse. Such a fuze may generate an arming voltage pulse upon being dropped or otherwise impacted.

Accordingly, it is an object of this invention to precondition arming on the substantially simultaneous presence of both adequate spin and setback forces.

SUMMARY OF THE INVENTION

A feature of this invention is the provision of a setback generator which requires the substantially simultaneous presence of both adequate spin and setback forces to permit relative movement of the core with respect to the coil.

BRIEF DESCRIPTION OF THE DRAWING

These and other objects, advantages and features of this invention will be apparent from the following specification thereof taken in conjunction with the accompanying drawing in which.

DESCRIPTION OF THE INVENTION

Figure 1A:
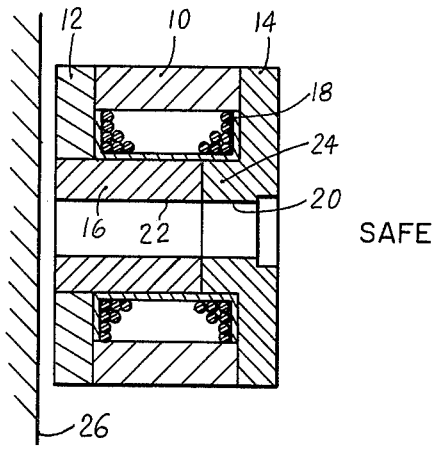
FIG. 1A is a diametral cross-section of a prior art generator in its safe configuration.

As seen in FIG. 1A, conventional setback generators include a relatively large, hollow, cylindrical cast "Alnico-5" magnet 10, two magnetically soft end caps, one a washer 12, and the other a disk 14, a cylindrical iron core 16 which completes the magnetic circuit and a coil 18 which surrounds the core. A longitudinal bore 20 may be provided in the disk 14, and a longitudinal bore 22 may be provided in the core 16. The disk may have a boss 24 on which the coil is seated. The assembly is spaced from a back plate 26 by suitable means, not shown.

Figure 1B:
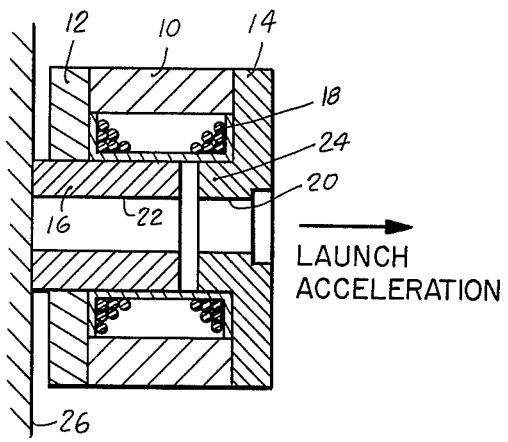
FIG. 1B is the generator of FIG. 1A in its setback and energized condition having provided an arming voltage output pulse.

Sufficient flux is generated by the permanent magnet 10 to completely saturate the core 16, and the core is held in place against the inside face of the end cap 14 by the force of magnetic attraction. Upon setback, as seen in FIG. 1B, the core 16 moves away from the end cap 14, and the magnetic field in the core 16 collapses to almost zero. This collapsing field induces a current in the coil which charges a capacitor through a series diode [both not shown here, but shown in U.S. Pat. No. 3,981,245]. The energy stored in the capacitor is then used to power a fuze detonating circuit, as by an electrical timing circuit operating an electrical detonator.

This conventional design has two major shortcomings: Firstly, any excessive vibration by the movable iron core 16 prior to projectile launch, as, for example, in storage or transit, may cause small, momentary air gaps to occur within the path of the magnetic circuit, and these variations in flux density may generate current pulses which will slowly charge the capacitor. This is a potentially dangerous situation even though other safing features may exist in the fuze design. Further, since the generator is designed to produce its full output at peak acceleration, which occurs within the barrel of the gun, an electronic circuit failure together with a safing and arming failure could cause detonation of the warhead of the projectile while it is still in the barrel, with adverse consequences to the operator thereof.

Figure 2A:
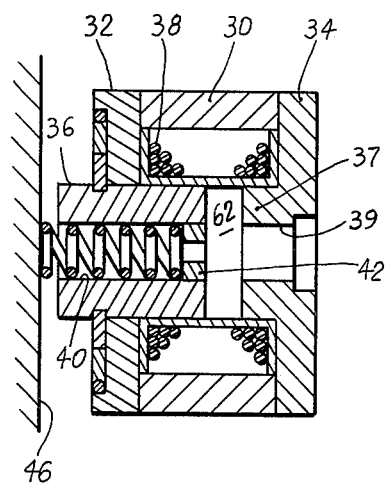
FIG. 2A is a diametral cross-section of a generator embodying this invention in its safe configuration.
Figure 2B:
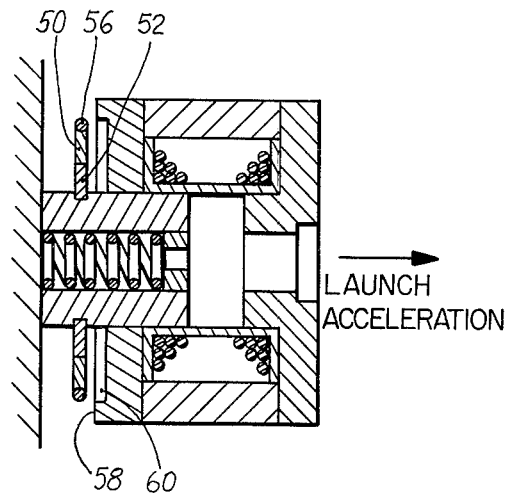
FIG. 2B is the generator of FIG. 2A in its setback semi-armed condition.
Figure 2C:
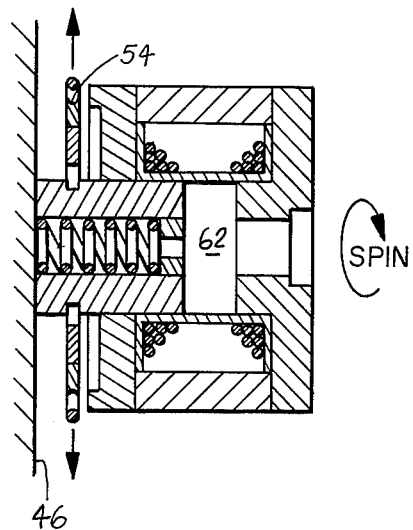
FIG. 2C is the generator of FIG. 2A in its spin full-armed condition.
Figure 2D:
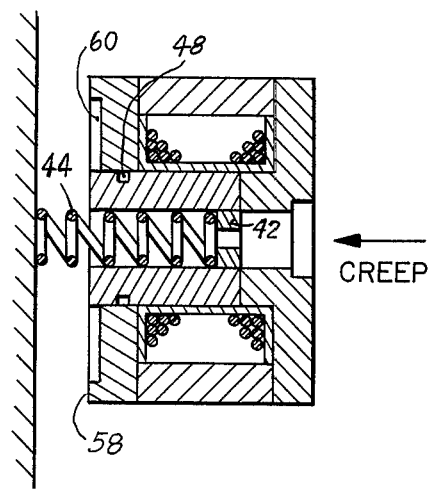
FIG. 2D is the generator of FIG. 2A in its energized condition having provided an arming voltage output pulse.

As seen in FIG. 2A, a setback generator embodying this invention includes a relatively large, hollow, cylindrical cast "Alnico-5" magnet 30, two magnetically soft end caps, one a washer 32, and the other a disk 34, a cylindrical iron core 36 which completes the magnetic circuit, and a coil 38 which surrounds the core. The disk 34 has a boss 37 on which the coil is seated, and a longitudinal bore 39. The core 36 has a longitudinal bore 40, which is closed by an annular plug 42 at its disk proximal end. A helical compression spring 44 is captured in the bore 40 between the plug 42 and a back plate 46 and urges the core towards the disk 34. The assembly is spaced from the back plate 46 by suitable means, not shown, for example, a stud through the bores 39 and 40. The core has an annular groove 48 in which are disposed two segments 50 and 52, which in conjunction, form an annulus divided on a diameter. The periphery 54 of the annulus is concave and receives an O-ring 56. The wall 58 of the washer remote from the disk 34 includes an annular cavity 60 of a diameter adequate to receive the assembly of the two segments 50 and 52 when disposed in the groove 48 and secured therein by the O-ring 56. This assembly, when concurrently disposed in the groove 48 and the cavity 60 limits movement of the core 36 towards the boss 37, to provide an air gap 62 within the magnetic circuit otherwise provided by the magnet 30, the disk 34 with the boss 37, the core 36, and the washer 32.

Any slight variations of the length of this air gap, such as might be produced by vibration of the core, do not generate any significant current pulse output.

The assembly of the segments 50 and 52 and the O-ring 56 will only depart the groove 48 and release the core 36 to further open the air gap 62 after experiencing a significant linear acceleration or setback compressing the spring 44 to carry the assembly longitudinally out of the cavity 60, followed and overlapped by a high rate of projectile spin. This spin up occurs as the projectile travels along the rifled gun barrel and is at its maximum at the muzzle. Only after these forces of acceleration and spin are experienced in this sequence will the segment assembly be freed from the core to allow the core to then move forward under the urging of the compressed helical spring 44, after the projectile exits from the muzzle. It may be noted that setback force conventionally is in the order of magnitude of +30,000 g at the breech and 16,000 g at the muzzle, and falls to −2 g upon exiting the muzzle, and, therefore, the spring is able to move the core to close the gap only after the projectile exits the muzzle. Upon moving forward, the core closes the air gap, completing the magnetic circuit and producing an output current pulse from the generator.

What is claimed is:

1. A setback generator for a projectile comprising:
an electrical conductor;
a normally open magnetic circuit including a source of flux disposed to provide inductive interaction with said conductor;
first means having a first, inoperative position, and a second, operative position for closing said magnetic circuit to increase said inductive interaction with said conductor;
second means for holding said first means in its inoperative position, and adapted to be disabled by the application in sequence of setback force and spin force;
third means for shifting said first means from its inoperative position to its operational position, and operational subsequent to the disablement of said second means;
said first means, during the course and said shifting, serving to change said inductive interaction with said conductor to thereby induce a current in said conductor.

2. A generator according to claim 1 wherein:
said third means is effective only upon the decrease of the setback force to zero.

3. A generator according to claim 2 wherein:
said first means comprises an element having a flux conductive characteristic.

4. A generator according to claim 3 wherein:
said third means comprises resilient means urging said element towards said second position.

5. A generator according to claim 1 wherein:
said first means has a third position, whereat said second means is susceptible to being disabled by the application of spin force, and which third position is spaced from said second position, the application of setback force serving to shift said first means from said second position to said third position.

6. A generator according to claim 5 wherein:
said third means is a helical compression spring.

7. A generator according to claim 5 wherein:
said first means comprises an element having a flux conductive characteristic.

8. A generator according to claim 7 wherein:
said second means comprises
a first cavity in said element,
a fixed part,
a second cavity in said fixed part,
additional means disposed in part in said first cavity and in part in said second cavity when said element is in its first position and thereby secured against removal from said first cavity, and freed from said second cavity when said element is in its third position thereby subject to removal from said first cavity by the application of spin force.

* * * * *